N. KAISER,
Assignor to SOCIETY FOR THE MANUFACTURE OF WOOD PULP.
METHOD OF AND APPARATUS FOR MANUFACTURING PAPER AND PASTEBOARD.
No. 10,074. Reissued Apr. 4, 1882.
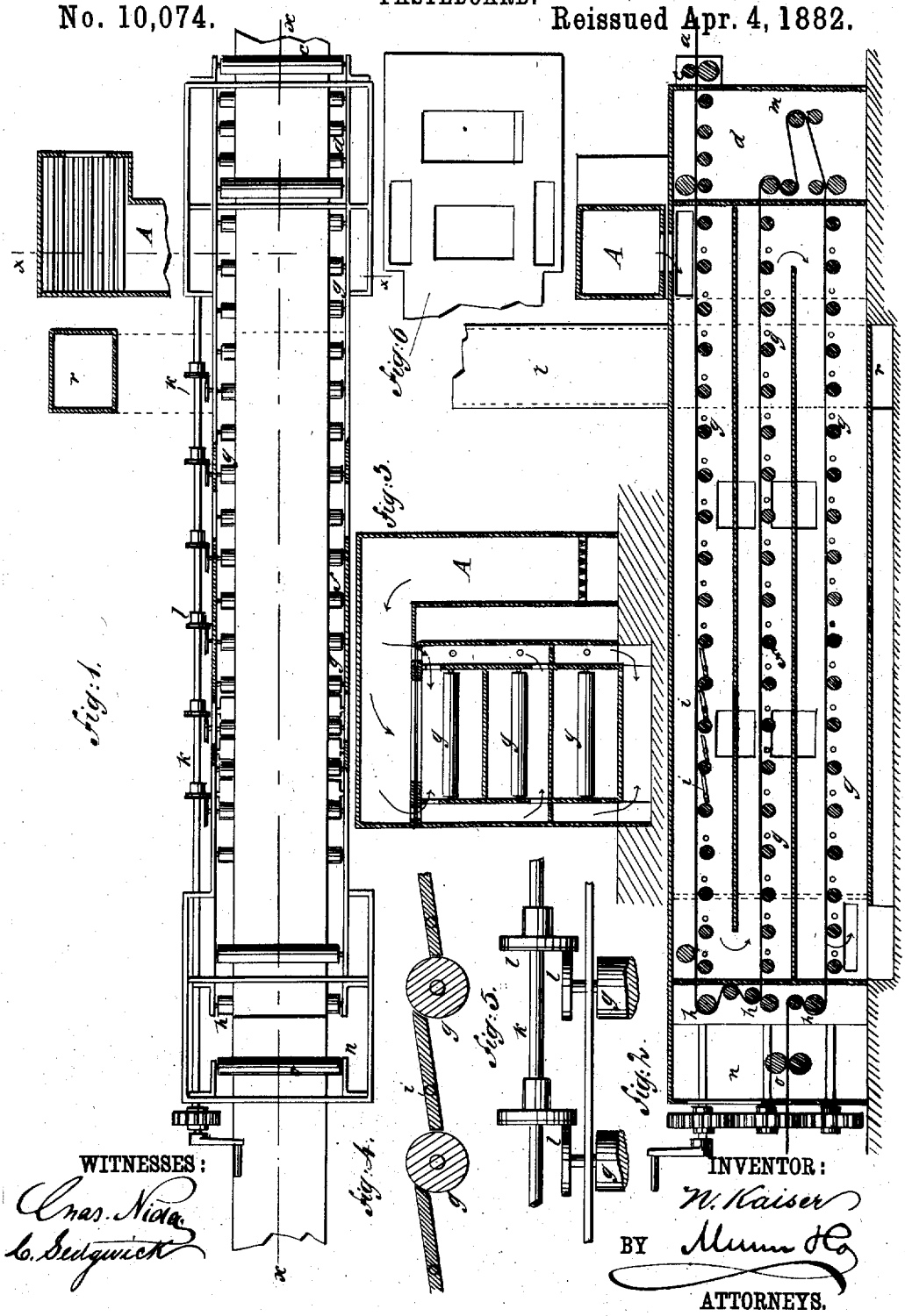
WITNESSES:
Chas. Nichols
C. Sedgwick
INVENTOR:
N. Kaiser
BY Munn & Co
ATTORNEYS.

UNITED STATES PATENT OFFICE.

NIKOLAUS KAISER, OF GRELLINGEN, SWITZERLAND, ASSIGNOR TO SOCIETY FOR THE MANUFACTURE OF WOOD PULP, OF SAME PLACE.

METHOD OF AND APPARATUS FOR MANUFACTURING PAPER AND PASTEBOARD.

SPECIFICATION forming part of Reissued Letters Patent No. 10,074, dated April 4, 1882.

Original No. 223,918, dated January 27, 1880. Application for reissue filed March 1, 1882.

*To all whom it may concern:*

Be it known that I, NIKOLAUS KAISER, of Grellingen, Switzerland, have invented new and useful Improvements in the Method of and Apparatus for the Manufacture of Paper and Pasteboard, of which the following is a specification.

My invention has for its object to provide means for improving the quality of machine-made paper as to its strength and toughness, and to enable manufacturers to make good machine-made paper by the mere use of mechanically-ground unboiled wood fiber without other admixture; and, finally, it has for its object to reduce the cost of plant and working of the paper-machines hitherto in use; and my invention relates more particularly to certain improvements in the process and apparatus for drying the paper or pasteboard in the course of its manufacture.

It is a well-known fact that machine-made paper is always of inferior quality as to strength and toughness than hand-made paper, even if the material used for both is quite the same. Now, I have found that this inferior quality of the machine-made paper is due to the fact that while the hand-made paper as it passes from the moist to the dry condition is perfectly free to shrink to the full extent both in the length and in the width, the machine-made paper is dried by causing it to pass over heated metal drying-cylinders and felt guides, by the use of which this free shrinkage not only cannot take place perfectly, but the paper is even stretched longitudinally, which can only be done at the expense of its strength and toughness.

My invention reposes on this observation made by me; and it consists of the process of drying the machine-made paper under conditions which allow it to be perfectly free to shrink in both directions without being subjected to any essential stretching or drawing action while it is subjected to the drying action of air or other gases heated by any heating apparatus; and it furthermore consists of an apparatus which by preference may be used for carrying out in practice the process or method in question. By means of this process and apparatus I am enabled to make machine-made paper of almost the same strength and toughness as hand-made paper, and even to make such machine-made paper by merely using mechanically-ground unboiled wood fiber without other admixture, which till now has not been possible, as such machine-made paper dried in the ordinary manner became too brittle.

In addition to the above advantages, the cost of plant is considerably reduced by doing away with the expensive drying-cylinders, and the working expenses are also less, as less fuel for heating is required.

My said method consists more particularly in the following operation, viz: The paper, coming in a more or less wet state from the wet long press or other machine, is conducted by means of guide-rollers, without any essential draft or stretch, through one or more closed chambers, where it is subjected to direct action of hot air, gas, or vapor until it has been sufficiently freed from moisture, whereupon it is let or not let through a wet satin-press, and is then again subjected to the action of heated gas or air until it has attained the same state of dryness as the atmosphere. Lastly, the paper may or may not be passed through a calender onto the winding-reel. The same process can also be applied, *mutatis mutandis*, to pasteboard.

The process may be carried out by means of apparatus such as is shown in the accompanying drawings and next described.

In the drawings, Figure 1 is a sectional plan view of the apparatus. Fig. 2 is a vertical longitudinal section. Fig. 3 is a vertical cross-section on line *x x* of Fig. 1. Fig. 4 is a sectional detail view in larger size. Fig. 5 is a detail view, showing the driving mechanism in larger size. Fig. 6 is a partial plan view, showing the inlets for the hot air.

Similar letters of reference indicate corresponding parts.

The moist paper coming from the wet long press or other machine, of which only the end press, *a*, is shown, passes through the receiving-rollers *c* into the front chamber, *d*, which is kept somewhat warm by the passage of heated air through the entrance and exit appertures for the paper. From the front chamber the paper passes into the drying-chamber proper, *f*, in which it is conducted backward and forward by suitable guides and transporting devices. These may consist, as shown in the drawings, of the rollers *g*, arranged in a horizontal plane at a certain distance apart, and fitted to revolve quicker than the speed of the paper, and thus rather push than draw the paper forward. These rollers *g* are arranged in as many rows, one above the other, as desired, to cause the paper to travel backward and forward in the chamber. At the end of each row of rollers the paper is led by means of two guide-rollers, *h*, on the row immediately below. The spaces between the rollers *g* are filled in by plates *i*, (shown most clearly in Fig. 4,) these plates being arranged so that they do not prevent the rotation of the rollers, and they prevent the paper from sinking down between the rollers. The rollers are driven by friction-disks *l* from a shaft, *k*, running parallel with the longitudinal axis of the chamber. There are as many shafts *k* as there are rows of rollers, and they will be driven by any suitable gearing. After the first passage to and fro the paper passes into the front chamber, *d*, and through the last wet press, *m*, from whence it passes back again to the drying-chamber, and then into the back space, *n*, which is also somewhat heated, and is led over the guide-roller *h* to the satin-press *o*, passing from the latter in an atmospherically dry condition out of the apparatus. The hot air coming from the calorifier (represented at A) is let from above, in the direction indicated by the arrows, above and below the paper, and issues, saturated with moisture, through the exhaust-passage *r* to the external air. If gases or vapors be employed in place of heated air, the calorifier is replaced by suitable gas or generating apparatus.

The carrying-rollers *g* may be replaced by any suitable devices—as, for instance, an endless belt—and if it be desired to pass the heated air in any other direction than that indicated, the calorifier or other apparatus would be arranged accordingly.

Having now described my invention and the manner in which it is carried out in practice, I claim—

1. The method of drying paper or pasteboard in continuous sheets by subjecting it to the direct action of hot air or other gases without any essential draft or stretch which could prevent the free shrinkage of the paper while drying.

2. The apparatus for drying paper or pasteboard in continuous sheets, consisting of a closed chamber in which hot air or gases are introduced, or in which air is heated by any apparatus, in combination with an apparatus by which paper or pasteboard in continuous sheets is led through the said chamber without subjecting the paper or pasteboard to any essential drawing or stretching action.

3. In an apparatus for drying paper or pasteboard in continuous sheets, a number of rotating rollers over and by means of which the paper or pasteboard is not so much drawn forward but pushed forward, so as not to be subjected to any essential drawing or stretching action.

4. In an apparatus for drying paper or pasteboard in continuous sheets, the plates *i*, combined with the carrying-rollers *g*, all as and for the purpose set forth.

In testimony whereof I have signed my name to this specification in the presence of two subscribing witnesses.

N. KAISER.

Witnesses:
E. TARAVICINI,
HENRY HOFACKER.